United States Patent [19]

Hedelin

[11] Patent Number: 4,539,946
[45] Date of Patent: Sep. 10, 1985

[54] METHOD OF CONTROLLING THE COMBUSTION CYCLE IN A COMBUSTION ENGINE

[76] Inventor: Lars G. B. Hedelin, Skärsnäsvägen 5, S-182 63 Djursholm, Sweden

[21] Appl. No.: 492,030

[22] PCT Filed: Sep. 6, 1982

[86] PCT No.: PCT/SE82/00275
§ 371 Date: Apr. 28, 1983
§ 102(e) Date: Apr. 28, 1983

[87] PCT Pub. No.: WO83/00901
PCT Pub. Date: Mar. 17, 1983

[30] Foreign Application Priority Data

Sep. 7, 1981 [SE] Sweden ............... 8105302

[51] Int. Cl.³ .............................. F02D 15/04
[52] U.S. Cl. ................. 123/48 A; 123/316; 123/202
[58] Field of Search ............ 123/48 A, 48 AA, 316

[56] References Cited

U.S. PATENT DOCUMENTS

| | | | |
|---|---|---|---|
| 906,177 | 12/1908 | Westinghouse | 123/48 AA |
| 1,106,210 | 8/1914 | Halterman | 123/48 A |
| 1,429,164 | 9/1922 | Ramsey | 123/48 C |
| 1,680,710 | 8/1928 | Wall | 123/48 A |
| 2,120,012 | 6/1938 | Andreau | 123/48 AA |
| 2,375,183 | 4/1945 | Arden | 123/48 AA |
| 3,919,986 | 11/1975 | Goto | 123/316 |
| 4,286,552 | 9/1981 | Tsutsumi | 123/48 AA |

FOREIGN PATENT DOCUMENTS

| | | |
|---|---|---|
| 117143 | 7/1899 | Fed. Rep. of Germany . |
| 189985 | 11/1905 | Fed. Rep. of Germany . |
| 290786 | 3/1913 | Fed. Rep. of Germany . |
| 488216 | 3/1928 | Fed. Rep. of Germany . |
| 536930 | 10/1931 | Fed. Rep. of Germany . |
| 1054780 | 4/1959 | Fed. Rep. of Germany . |
| 1193305 | 5/1965 | Fed. Rep. of Germany . |
| 2017115 | 10/1970 | Fed. Rep. of Germany . |
| 2426985 | 1/1975 | Fed. Rep. of Germany . |
| 2137596 | 11/1976 | Fed. Rep. of Germany . |
| 2705339 | 8/1978 | Fed. Rep. of Germany . |
| 2829774 | 1/1979 | Fed. Rep. of Germany . |
| 177916 | 1/1962 | Sweden .............. 123/48 A |
| 422346 | 3/1982 | Sweden . |

Primary Examiner—Michael Koczo
Assistant Examiner—John J. McGlew, Jr.
Attorney, Agent, or Firm—Ostrolenk, Faber, Gerb & Soffen

[57] ABSTRACT

In a combustion engine, the amount of working medium is controlled by allowing the engine to suck in an amount of working medium corresponding to full gas operation, of which a portion is then allowed to flow out again without being compressed, while an amount proportional to the current load is retained and compressed, the compression ratio being regulated as a function of the amount of working medium retained. In such an engine there is a movable member (4) for adjusting the compression ratio, the position of said member being controlled by a control means (9). Furthermore, there is at least one spill flow valve (12), the open-time of which is variable as a function of the current load of the engine.

6 Claims, 6 Drawing Figures

METHOD OF CONTROLLING THE COMBUSTION CYCLE IN A COMBUSTION ENGINE

The invention relates to a method of controlling the combustion cycle in an internal combustion piston engine in which a gaseous working medium is compressed, is combusted and performs work, and in which the compression ratio is varied during operation.

The invention also relates to the design of a combustion engine.

In a conventional combustion engine, the amount of gaseous working medium used in the engine in each cycle will vary with the throttle opening and the engine speed, for example. Since the compression ratio is not changed, this will result in the compression pressure varying with the operating conditions for the engine. Consequently, the thermo efficiency of the engine will vary under varying operating conditions. Since the efficiency is generally optimized for high r.p.m. and large throttle opening, this means that the average efficiency will be low.

It is also known, by German Patent Specification No. 536 930 for example, to vary the compression during operation. As in conventional combustion engines however, all of the working medium drawn in is compressed. The air/fuel ratio will thus vary under operating conditions, and therefore the engine will not have an optimum average efficiency.

The purpose of the invention is to achieve a combustion engine with improved efficiency under varying operating conditions.

This is achieved according to the invention by regulating the amount of working medium by allowing the engine to draw in a maximum amount of working medium corresponding to full gas operation, of which a portion is then allowed to flow out again without being compressed and of which an amount proportional to the current load is retained and compressed, and that the compression ratio is regulated as a function of the amount of working medium retained so that substantially the same compression pressure is obtained under varying operating conditions.

In an internal combustion piston engine provided with at least one chamber in which there is a first movable member by means of which the gaseous working medium is compressed and after combustion performs work, and in which there is a second movable member for setting the compression ratio, the position of said second movable member being controlled by a control means, this is achieved by said chamber having at least one spill flow valve, the open-time of which is variable as a function of the current load of the engine to make possible, prior to compression, spilling out of a portion of the maximum amount of working medium introduced into the chamber, and that the control means is arranged to set the second movable member in such a position, as a function of the retained amount of working medium corresponding to the current engine load, that the compression pressure is essentially the same under varying operating conditions.

In contrast to what is the case in the prior art, the invention adapts the working volume of the engine to the current requirement. By virtue of the fact that the engine according to the invention operates under full gas conditions even at reduced load, improved efficiency is made possible. This contributes to an improved total efficiency for the engine according to the invention.

The invention will be explained in more detail in the following with the aid of the examples shown in the accompanying drawings.

Figure 1:
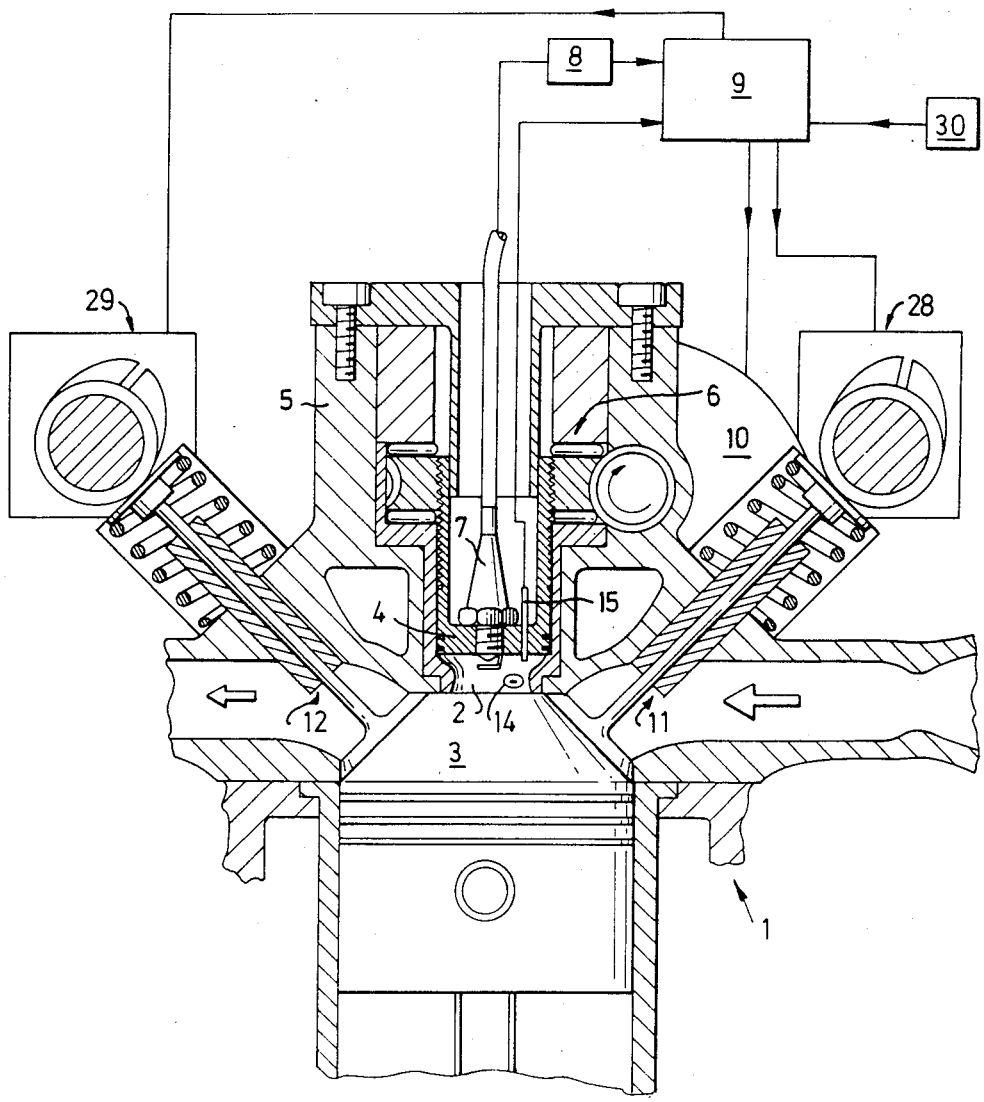
FIG. 1 shows an engine according to the invention with a reciprocating piston.

A combustion engine 1, only partially illustrated in FIG. 1, of the type with reciprocating pistons, has a number of chambers 2 of which only one is shown in the figure. In each such chamber there is a first movable member 3, in the form of a reciprocating piston, which is in its upper dead center position in the drawing. In the chamber 2 there is also a second movable member 4 which is in the form of an axially displaceable piston in the engine head 5. With the aid of a setting means 6, it is possible to move the piston 4 to different positions to change the compression ratio in the chamber 2. In the drawing, the piston 4 is in its lowest position, where the engine is thus operating at a maximum compression ratio. The piston 4 holds a spark plug 7 which is connected to the ignition unit 8 of the engine, which provides information on the current engine speed to a control means 9 which is in turn connected to a setting motor 10 in the setting means 6.

The inflow into the chamber 2 is controlled by a valve mechanism 11, and the outflow is controlled by a valve mechanism 12. The valve mechanism 11 is controlled by a valve control means 28, while the valve mechanism 12 is controlled by a corresponding valve control means 29. Both of these valve control means are in turn controlled by the control means 9. With the aid of the valve control means 28 and 29, which are both of the type which has already been described in International Patent Application No. PCT/SE81/00259, corresponding to U.S. application Ser. No. 385,393, filed on May 25, 1982 now U.S. Pat. No. 4,498,352 it is possible during operation to change the shape of the cams which control the valves, so that the opening and closing times for the valves can be varied as desired, for example as a function of engine r.p.m. and load. This makes it possible to improve the through-flow in the chamber 2. The details regarding the design of these valve control means are given in said patent application and therefore do not need to be repeated here. Fuel is injected directly into the chamber 2 with the aid of an injection jet 14.

The amount of working medium is regulated by keeping the outlet valve open during a controllable portion of the upward movement of the piston 3. By allowing introduced working medium to flow out again, it is possible to compress only as much working medium as is required at that time. Thus the compression phase will be initiated at different positions of the piston 3, depending on the current operating conditions. The principle for such an engine has been described previously in International Patent Application No. PCT/SE81/00201, corresponding to U.S. application Ser. No. 355,590, filed on May 22, 1982. which describes the advantages of such a design in more detail.

Thus in this type of "full gas engine", varying volumes of working medium will be compressed, depending on engine load. Without the second movable member 4, the engine compression ratio would vary as a function of load, with the result that the compression pressure would also vary as a function of load. With the aid of the piston 4, it is now possible to affect the compression ratio of the engine so that a compression pressure essentially independent of the operating conditions is obtained.

The valves can be given the desired operating curve by controlling the valve control means 28 and 29 via the control means 9, which can for example receive information on the size of the load on the engine from a gas pedal 30 and by using this information can set the valve control means 28 and 29 for the desired through-flow in the engine. A pressure sensor 15 mounted in the piston 4 senses the pressure in the chamber 2 and delivers this information to the control means 9.

Since the movement of the piston 3 is normally synchronized to the movement of the valves in the chamber 2, and since the time for ignition of the gas mixture is related to a certain position of the piston 3, it is possible, by using the information from the ignition unit 8, to determine the position of the piston 3 at the moment when the compression phase begins, i.e. when the valves have just closed. By simultaneously registering the pressure in the chamber 2 it is therefore possible to compute what compression pressure will be able to be achieved in the chamber 2. Such a computation can be carried out in the control means 9, which by comparing the computed value and a command value for the compression pressure can send an impulse to the setting motor 10 to change the position of the piston 4 so that the desired compression pressure in the chamber 2 is achieved. When the engine speed and/or throttle opening is then changed, the pressure in the chamber 2 measured at the beginning of the compression phase will also be changed, with the result that the control means 9 sends an impulse for changing the position of the piston 4. A large throttle opening will mean that the piston 4 will be in a high position, while a small throttle opening will mean that the piston 4 will be in a low position. Since the combustion engine normally has a specific r.p.m. at which the engine can function optimally, the flow through the engine will also be affected by the r.p.m. With knowledge of how the through-flow varies with the engine speed it is thereby possible, via the control means 9 and the piston 4, to correct the compression pressure in the chamber 2 for variations caused by engine speed change. It is of course also possible to provide the control means 9 with other information concerning the current operating conditions of the engine in order to control, with the aid of the piston 4, the compression pressure in the chamber 2 as a function thereof.

In applying the invention to a diesel engine, the control means 9 can suitably receive engine speed information from an injection unit, which is in turn connected to an injection jet. Otherwise the design can be in principle the same as that of the engine in FIG. 1. Contrary to what is the case in a common diesel engine, according to the invention it is possible when starting the engine to set the piston 4 in such a position that the engine can start from a cold state without the aid of hot bulbs for example.

Figure 2:
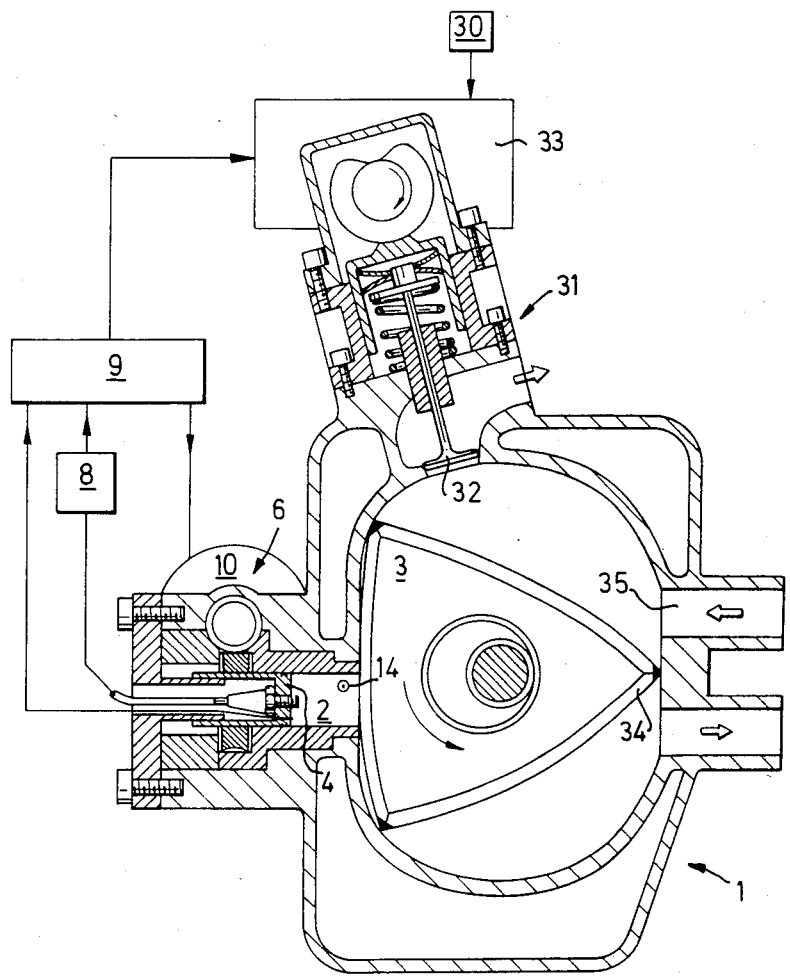
FIG. 2 shows an engine according to the invention with a rotating piston.
Figure 3:
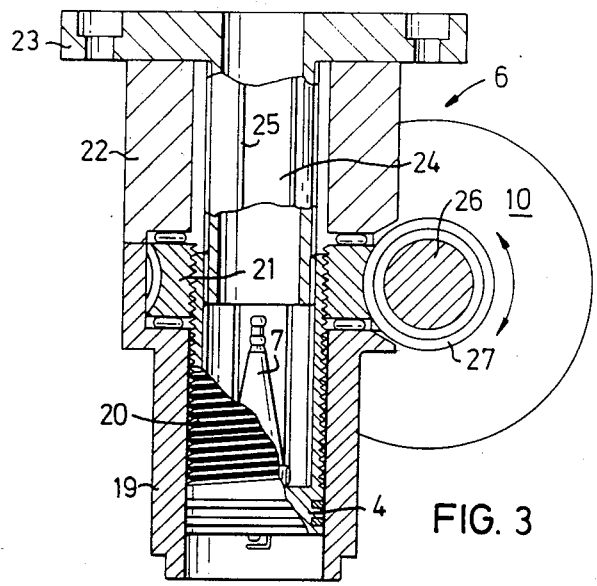
FIG. 3 shows a section through a setting means.

Even a Wankel engine can, as can be seen in FIG. 2, be modified so that the amount of working medium, instead of being controlled with the aid of a throttle at the inlet, can be controlled with the aid of a special valve mechanism 31 which permits, as a function of the operating conditions, a variable amount of the working medium drawn in to flow out again. The valve mechanism 31 is also of a type which is described in International Patent Application No. PCT/SE81/00259, corresponding to U.S. application Ser. No. 385,393, filed May 25, 1982. and which is so constructed that the valve 32 will move upwards when it opens. Thus the valve 32 does not hinder the movement of the piston 3. A suitable pattern of movement for the valve 32 is set with the aid of the valve control means 33 which is in turn controlled by the control means 9.

The valve 32 can open at the earliest when the piston tip 34 has just passed the inlet 35 and can close at the latest when the piston tip 34 has almost reached the valve 32. The piston 4 has in this case, as in the embodiment according to FIG. 1, the task of compensating for the change in compression ratio caused by the operating conditions via the valve 32, so that an essentially constant compression pressure is maintained. The fuel is injected directly into the chamber 2 with the aid of an injection jet 14.

In engines of the type described in FIGS. 1 and 2, the amount of fuel injected is so adapted to the amount of working medium to be compressed that an essentially constant air/fuel ratio is obtained at varying operating conditions. The valve times are automatically adapted to the engine speed and load at that time, so that a high degree of filling is maintained at the same time as the gas exchange work is kept at a relatively low level. The throttle position thus determines how great an amount of working medium is to be retained for compression, the moment when the compression phase is to be begun, and the amount of fuel injected per work cycle. Otherwise a combination of the throttle position and engine speed determines the selection of the valve times.

To achieve as large a range as possible for the compression ratio, it is advisable to make the chamber 2 in such a way that it will have a very small volume when the first movable member 3 is at its end position. For this reason the piston 3 in FIG. 1 has been made in such a way as to leave a very small space when in its end position. As can also be seen in FIG. 1, the transition between the zone of the chamber 2 in which the piston 3 moves and the zone in which the piston 4 moves, there is a more or less pronounced constriction, as desired. The piston 4 can also, instead of as is shown in FIG. 2, be placed so that its direction of movement forms an angle to the direction of movement of the piston 3. The setting means 6 can also be made as a lever mechanism instead of as a screw mechanism.

Figure 4:
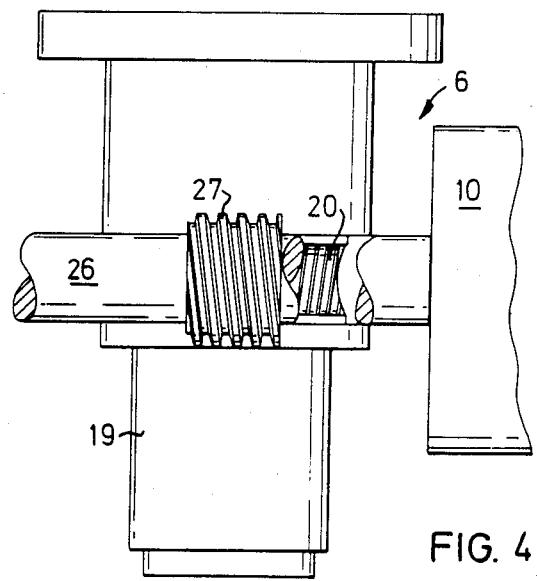
FIG. 4 shows a view of the setting means in FIG. 3.
Figure 5:
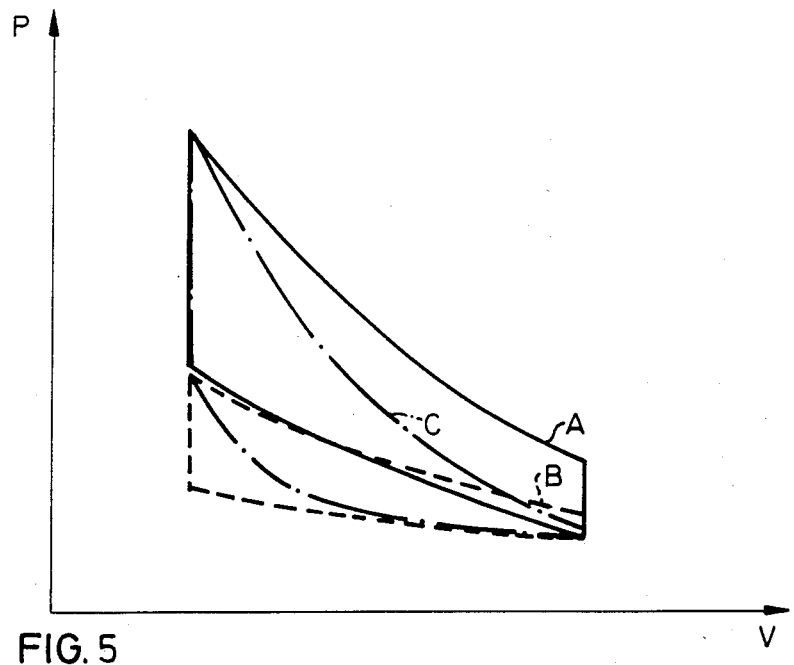
FIG. 5 shows a p-V diagram with various work curves.

The details of the design of the setting means 6 in the embodiments according to FIGS. 1 and 2 are shown in FIGS. 4 and 5. The second movable member 4 in the form of an axially displaceable piston runs in a lower cylinder 19, which is designed to be mounted in the engine head 5. Via an external thread 20, the piston 4 engages a nut 21 which is rotatably mounted in the lower cylinder 19 and is designed to be kept in place therein with the aid of an upper sleeve 22 which is in turn designed to be kept in place in the engine head 5 with the aid of a holder 23 which is to be fixed to the head with the aid of screw fasteners for example. The holder 23 has an axial portion 24 which is in rotationally fixed engagement with the inside of the piston 4. To achieve the desired rotational fixing, the axial portion 24 can be provided with axially directed splines 25 for example, which interact with corresponding cavities in the inside of the piston 4. The nut 21 engages a worm gear 27 which is rotationally fixed on a shaft 26. With the aid of the setting motor 10, the shaft 26 can be rotated in the direction desired to move the piston 4 via the worm gear 27 and the nut 21 upwards or downwards, as desired. The shaft 26 can to advantage be connected to several chambers in the engine. By using a step motor as the setting motor and by using fine pitches, the setting of the second movable member 4 can be done with great precision. By also selecting a relatively small diameter of the second movable member 4, the forces affecting it as the motor operates can be limited, thereby facilitating positional adjustment. The shaft 26 must of course be mounted in a suitable manner in the engine head 5, and the setting motor 10 must of course be mounted so as to be fixed rotationally relative to the engine head 5.

The embodiments described above can be varied in a number of different ways within the scope of the invention. For example, it is possible to replace the spark plug 7 with a fuel injection jet in the piston 4 and instead place the spark plug at another location in the engine head. The pressure sensor 15 can also be placed differently than as shown. Furthermore, it is normally not necessary to have a pressure sensor in more than one or two chambers in the engine.

By making the chamber volume variable, it is thus possible to maintain essentially constant compression pressure regardless of the crankshaft angle at which the inlet valve closes, and regardless of the current pressure in the chamber. The compression pressure and gas temperature can be selected to be so high that it will not be necessary to reduce the air/fuel ratio to any significant degree to maintain favorable combustion conditions, which is essential for maintaining good total efficiency and cleaner exhaust. Thus the operating conditions of the engine can be improved within a very wide range of engine speeds and loads.

If the engine is turbo-charged, it is not necessary to limit the boost pressure within the range for the optimum gas exchange work for the engine. The compression pressure can instead be limited by increasing the volume of the chamber. Under such operating conditions the actual compression ratio of the engine is thus lower than the nominal compression ratio, despite the fact that the resulting compression pressure has not been changed. The engine can thus work at a higher average pressure without increasing the nominally set maximum combustion temperature and pressure. Despite the fact that the temperature ratio between combustion temperature and exhaust temperature is somewhat poorer, the total efficiency can still be improved.

FIG. 5 shows in the form of a work diagram (p-V diagram) a comparison between a conventional four-stroke engine and a "full gas engine" according to the invention of the type exemplified in FIGS. 1 and 2. The solid line A represents a cycle diagram for an engine at full load and applies both to a conventional four-stroke engine and to a "full gas engine" according to the invention. The dashed line B represents a cycle diagram for a conventional four-stroke engine at reduced load (approx. 30% of maximum load). Finally, the dash-dot line C represents a cycle diagram for a "full gas engine" according to the invention also at about 30% of maximum load. The advantages of the engine according to the invention over conventional engines at reduced load are clearly evident from the figure, making substantially improved efficiency possible by being able to keep the compression pressure (the pressure level at the lower end of the left-hand vertical portion of the cycle) at the same level as for full gas operation (curve A). The higher compression pressure also means a higher compression temperature.

It is essential to note in this connection that for a conventional engine, the best possible work cycle can only be obtained at a certain predetermined engine speed, while in a "full gas engine" according to the invention it is possible to achieve the best possible work cycle within a large r.p.m. interval. The adjustability of the valves contributes appreciably to the advantageous result of the invention.

Figure 6:
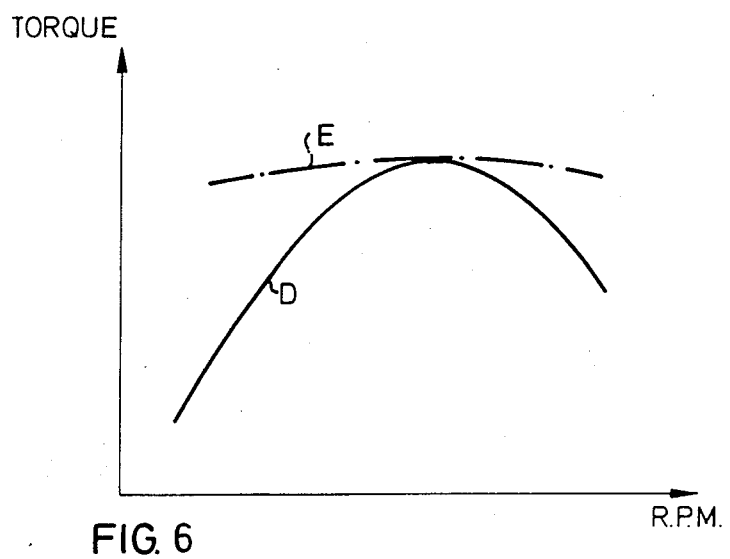
FIG. 6 shows torque curves.

FIG. 6 shows schematically the difference in the shapes of the torque curves for the different engines. The curve D is for a conventional four-stroke engine, while curve E is for a "full gas engine" according to the invention. As is clearly evident, the torque in a conventional engine drops off sharply on both sides of a maximum. In an engine according to the invention however, the torque curve is substantially flatter, which is largely dependent on the fact that more advantageous valve times can be used. At high r.p.m., it is possible according to the invention to avoid the inlet valve closing too early, and thus the engine can be provided with more working medium, which improves the torque. At low r.p.m., it is possible according to the invention to prevent the outlet and inlet valves being open too long at the same time, and thus it is possible to achieve better through-flow, which in turn improves the torque.

I claim:

1. A method of controlling the combustion cycle in an internal combustion piston engine in which a gaseous working medium is compressed, is combusted and performs work, and in which the compression ratio is varied during operation, comprising:
    regulating the amount of working medium by operating the engine to draw in a maximum amount of working medium corresponding, to full gas operation and then causing a portion of the working medium to flow out again without being compressed;
    retaining and compressing an amount of the working medium proportional to the current load; and
    regulating the compression ratio as a function of the amount of working medium retained to obtain a substantially constant compression pressure under varying operating conditions.

2. The method of claim 1 in which retaining and compressing the amount of the working medium comprises closing a valve controlling the flow of working medium out of a chamber defined in the engine when the amount of working medium in the chamber is proportional to the current load.

3. The method of claim 2, further comprising determining the position of a piston in the chamber and sensing the pressure in the chamber immediately after the valve is closed; regulating the compression ratio comprising varying the compression ratio in accordance with the determined piston position and the sensed pressure.

4. The method of claim 3 in which varying the compression ratio comprises varying the volume of the chamber.

5. The method of claim 1 in which regulating the compression ratio comprises varying the volume of a chamber defined in the engine.

6. The method of claim 1, further comprising injecting an amount of fuel into the compressed working medium to obtain a substantially constant working medium/fuel ratio under varying operating conditions.

* * * * *